United States Patent [19]

Doege et al.

[11] Patent Number: 4,666,364

[45] Date of Patent: May 19, 1987

[54] LOW FRICTION CYLINDER FOR MANIPULATORS, BASED ON THE PANTOGRAPH PRINCIPLE AND EQUIPPED WITH A PNEUMATIC BALANCER CONTROL

[75] Inventors: Joachim Doege; Hanns-Dieter Paschke; Ke D. Tran, all of Berlin, Fed. Rep. of Germany

[73] Assignee: Stahl Aufzge GmbH & Co. KG, Fed. Rep. of Germany

[21] Appl. No.: 622,126

[22] Filed: Jun. 19, 1984

[51] Int. Cl.[4] ............................................. B66F 9/04
[52] U.S. Cl. .................................. 414/742; 414/917; 248/325
[58] Field of Search ............... 414/719, 742, 744 R, 414/917; 901/14, 17, 48; 248/325; 267/118, 122

[56] References Cited

U.S. PATENT DOCUMENTS

| 3,721,416 | 3/1973 | Goudreau | 248/325 |
| 3,747,886 | 7/1973 | Carlson et al. | 248/325 |
| 3,883,105 | 5/1975 | Matsumoto | 414/719 X |
| 3,995,746 | 12/1976 | Usagida | 414/917 X |
| 4,421,450 | 12/1983 | Kouno | 414/719 |

FOREIGN PATENT DOCUMENTS

| 0101141 | 6/1982 | Japan | 267/122 |
| 1209308 | 10/1970 | United Kingdom | 414/742 |
| 0895904 | 1/1982 | U.S.S.R. | 414/719 |

Primary Examiner—L. J. Paperner
Assistant Examiner—Lyle Kimms

[57] ABSTRACT

In a pantograph load handling device having work arms formed of a parallelogram linkage, an improved load cylinder arrangement is provided comprising a flexible diaphragm disposed in a loose support arrangement to afford vertical movement of the load in a more accurate and inexpensive operation than heretofore known.

8 Claims, 4 Drawing Figures

LOW FRICTION CYLINDER FOR MANIPULATORS, BASED ON THE PANTOGRAPH PRINCIPLE AND EQUIPPED WITH A PNEUMATIC BALANCER CONTROL

CROSS-REFERENCE TO RELATED APPLICATION

The subject matter of this application generally relates to the subject matter of an earlier filed application by the same inventors which is Ser. No. 583,892, filed Feb. 27, 1984, and commonly assigned herewith.

BACKGROUND OF THE INVENTION

The present invention concerns improvements in the construction and operation of load handling mechanisms or manipulators which are used for hoisting, positioning, and otherwise handling of loads, such as workpieces, within a given working space having predetermined dimensions and also serve for loading or unloading parallel wall spaces such as shelves. More particularly, the invention relates to a load handling device or manipulator which functions according to pantograph principles having a parallelogram linkage which enables movement of the load in a horizontal direction in a very simple manner.

In devices of this pantograph type, a horizontal guideway directs movement of the load in an axial horizontal direction. A pivot bearing enables horizontal rotary motion of the load handling device around a vertical axis at a given vertical evaluation from a floor, ceiling, or carrier. Since the geodetic elevation of the load is not altered given movement of the load in the horizontal direction, this movement theoretically requires almost no work. The vertical movement and positioning of a load has been typically accomplished by means of a pressure agent which acts on a piston in a load cylinder. The piston has a piston rod projecting out of the cylinder, such that upward or downward movement of the load is due to the admission or discharge of the pressure agent flow in the cylinder and the load is held at a given elevation given a cylinder closed to such flow.

A pressure balance control device has been employed in the operation of such pantograph load handling devices. In such a control device the pressure in the load cylinder is compared to a constant reference pressure that is predetermined for each load and, depending on the pressure differential, pressure agent is supplied to or discharged from the load cylinder by means of a balancer valve such that pressure agent is supplied into the load cylinder when the cylinder pressure is lower than the reference pressure and pressure agent is discharged when the cylinder pressure is higher than the reference pressure. The existence of a differential between load cylinder pressure and reference pressure usually arises from manual lifting or lowering of the load. The operator thus needs to exert such force on the load that the friction in the load cylinder is overcome and this pressure differential becomes great enough for the balancer valve to operate in order for him to vertically move the load. Load cylinder friction is the result of friction between the piston seal and cylinder wall and between the piston rod and its guide means.

The force exerted to overcome load cylinder friction must be so high that a sensitive and accurate movement that does not present fatigue problems is typically not possible.

Another disadvantage to piston-type load cylinders heretofore employed in pantograph load handling devices is that the piston rod must be precisely guided in a straight line motion in order to achieve a faultless interaction of the piston seal with the cylinder wall. Yet, the load cylinder and piston rod are connected to different parts of the load handling device which are relatively movable and involve still further guide devices. Thus, the guide connection between the cylinder and piston rod must therefore be flexible, and this has necessitated that the guide connection be large and of considerable overall length making it relatively expensive.

SUMMARY OF THE INVENTION

An object of the present invention is to afford a sensitive and accurate load movement free of fatigue problems in a pantograph load handling device by employing a flexible, expansible chamber diaphragm disposed in a loose support arrangement in place of the conventional piston-type load cylinder device. Pressure agent flow is admitted to or discharged from the chamber diaphragm for vertical movement of the load, or the chamber diaphragm is closed against flow for holding the load at a given elevation. The diaphragm is self-contained and sealed from the support arrangement. The support arrangement comprises a diaphragm cylinder and a support post between which the diaphragm is supported for adjusting the relative vertical distance therebetween.

A further object of the invention is to enable the diaphragm cylinder and support post to be separately supported of one another on the load handling device and to have the diaphragm cylinder movement relative to the guide rod maintained by a guide carriage disposed for free movement on a vertical pillar of the load handling device.

A futher object of the invention is to center the diaphragm cylinder or support post within its guidance support such that vertical pressure forces on the cylinder or support past from chamber diaphragm expansion or retraction are wholly accurately reflected by the guidance support without errors due to twisting or slippage. Further, in this regard, the vertical pressure forces are accurately reflected and twisting is prevented in the vertical movement of a horizontal guideway of the load handling device engaged by the diaphragm cylinder through the use of a connection having one or more conical pins extending into cooperating bores.

A still further object of the invention is to provide an damper apparatus connected between stationary and vertically movable portions of the load handling device to brake vertical movement of the load in the event of an excessive downward acceleration or velocity, such as due to diaphragm rupture.

Other objects, advantages and features will become more apparent from the teachings of the principles of the invention in connection with the disclosure of the preferred embodiments thereof in the specification, claims, and drawing below.

DESCRIPTION OF THE PREFERRED EMBODIMENTS

Figure 1:
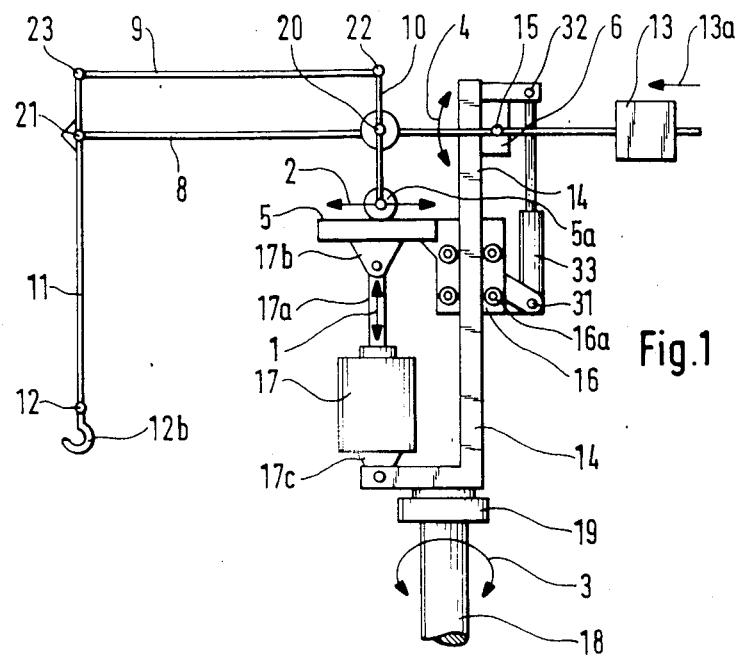
FIG. 1 is a side elevational schematic view showing a pantograph load handling device using a piston-type load cylinder arrangement.

As is illustrated in FIG. 1, a pantograph load handling mechanism is carried on a stand 18 which may be in the form of a column mounted on a work floor. It will be understood that the mechanism may be also supported from an overhead arrangement or other support structure.

The load handling mechanism is rotatably supported on the column by a bearing structure 19 so as to be rotatable as shown by the arrowed arcuate line 3. Rotational control on the bearing 19 is not power driven.

Mounted on the column is a vertical pillar 14. Supported on the vertical pillar is a horizontal work beam which includes horizontally extending parallel arms 8 and 9 with the lower arm 8 extending past the pillar 14 and pivotally mounted at 15 on a retianing part 6 which is vertically adjustable on the vertical pillar 14. The horizontal work beam has pivotal movement as shown by the double arrowed line 4.

To the right of the vertical pillar 14 and to the right of the pivotal support 15 is a horizontally adjustable counterweight 13 which is lockable to the arm 8 and which is adjustable horizontally as shown by the arrowed line 13a. The counterweight is adjustable horizontally to counter-balance the pivotal weight of the parallel arms 8 and 9 and the associated linkage.

The parallel arms 8 and 9 are interconnected by links at each end with the link at the left end shown connected at pivot points 21 and 23 to the parallel arms 8 and 9 respectively. At the right side of the parallel arms is a link or lever 10 which is pivotally connected at its upper end 22 to the parallel arm 9 and at an intermediate point 20 to the arm 8. The lever 10 extends downwardly, and at its lower end carries a roller 5a which moves horizontally in a trackway 5 as indicated by the arrowed line 2. The roller 5a is allowed to move freely on the trackway 5. The single trackway on which the roller moves extends horizontally and is supported for vertical movement on a heretofore known piston-type load cylinder mechanism having a load cylinder 17 having a lower end pin connection 17c on the lower L-shaped end of the pillar 14 and a hollow interior with an open upper end in which is disposed a piston bearing side seals engaging with the cylindrial walls of the cylinder 17. The piston has a piston rod extension 17a which is connected by a pivotable pin engagement 17b with the undersurface of the trackway 5. To guide the trackway vertically, rollers 16a in a guide carriage 16 move up and down along ther vertical pillar as the piston and cylinder 17 are operated to controllably elevate the trackway 5. The load cylinder mechanism 17 is pivotably connected to the guide carriage 16 via the pin engagement 17b.

A damper apparatus in the form of a piston and cylinder fluid damper mechanism 33 is connected between a pivot connection 32 mounted at the upper end of the stationary pillar 14 and a pivot connection 31 mounted on the vertically movable guide carriage 16. The damper apparatus serves a check on vertical movement velocity of the load.

At the load end of the work beam is a depending vertical work arm 11 which has pivotally connected at 12 a load securing hook 12b.

In operation of the structure of FIG. 1, vertical movement of the load connected to the hook at 12b is attained by the piston and cylinder 17 which move up and down to move the trackway 5 up and down and the beam will pivot vertically about its pivot point 15 accordingly. Horizontal movement in a rotary direction is achieved by rotation of the assembly on the vertical stand or column 18. A movement of the roller 5a and a movement of the bearing 19 takes place by moving by hand the load or hook at the end of the vertical arm 11.

A feature of the load handling structure of FIG. 1 is that the ratio of distances referred to as "i" of the pivotal centers from (15 to 20) to (15 to 21) is equal to the ratio of the distances of (20 to 5a) to (21 to 12). The pivotal bearing centers of 12, 5a, and 15 are disposed in a straight line.

Figure 2:
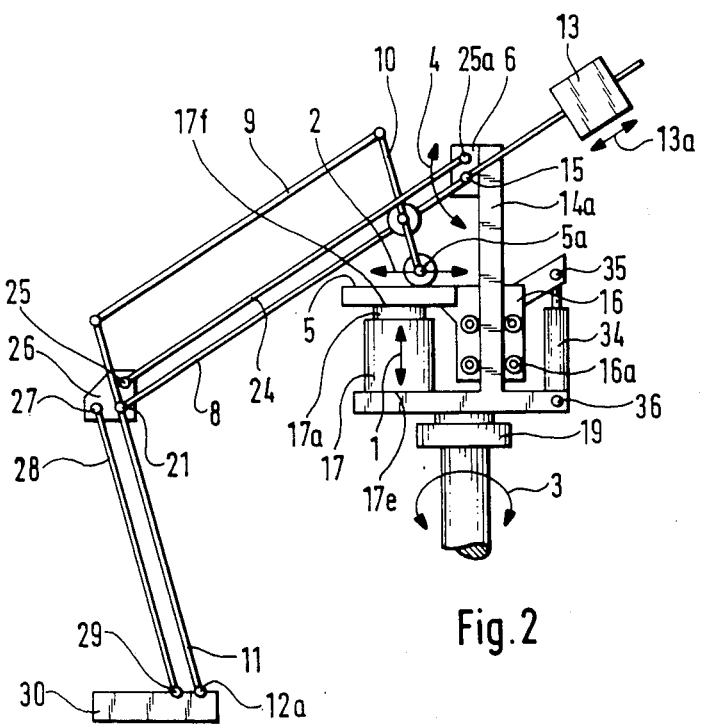
FIG. 2 is a side elevational schematic view showing a different pantograph load handling device using a load cylinder arrangement with a flexible diaphragm.

FIG. 2 illustrates another type of plantograph load handling device having a load cylinder mechanism which is a diaphragm-type arrangement. Similar parts relative to FIG. 1 are given similar numbers in FIG. 2. The work beam is shown including parallel arms 8, 24 and 9. The upper ends of arms 8 and 24 are pivotally connected to a retaining part 6 which is mounted on the vertical pillar 14. In the arrangement illustrated, the counter-balancing weight 13 which is adjustably movable in the direction indicated by the arrowed line 13a is provided on an extension of the parallel arm 8 in a manner similar to the structure of FIG. 1.

At the right end of the work beam, the lever 10 connects to a roller 5a at its lower end which moves in the trackway 5 similar to the structure of FIG. 1, and the structure also rotates on a upturned T-shaped pillar 14a in the same manner as FIG. 1.

At the left end of the work beam, the arm 8 is pivotally connected at 21 to a guide plate 26. The arm 24 is pivotally connected at 25 to the guide plate 26. The downwardly extending work arm 11 is also connected to a load carrying extension 30 at 12a. Another downwardly extending work arm 28 is pivotally connected at 27 at its upper end to the guide plate 26, and at its lower end at 29 to the extension 30. The extension may be provided with a work connecting hook at its projecting end shown to the left in FIG. 2. Movement of the work beam arms as the load is lifted is shown by the arrowed line 4.

A damper apparatus 34 is connected between a pivot connection 36 mounted on the right horizontal crossarm of the pillar 14a and a pivot connection 35 mounted on the vertically movable guide carriage 16.

The distances between the pivotal centers 25 and 25a and between 15 and 21 are of the same length. The distances between the pivotal centers 27 and 29 and between 21 and 12a are of the same length. The lines between the pivotal centers 15 and 25a and between 21 and 25 are of the same length and parallel to one another. The lines between the pivotal centers of 21 and 27 and betwen 12 and 29 are of the same length and parallel to one another.

A diaphragm-type load cylinder mechanism is utilized in this load handling device of FIG. 2 containing a cylinder 17 in which a support post is reciprocably disposed with a extension 17a. In contrast to the piston-type load cylinder of FIG. 1, however, the support post extension 17a is rigidly connected with the undersurface 17f of the trackway 5 and the lower end of the cylinder 17 is rigidly connected onto the upper surface 17e of the left horizontal cross-arm of the pillar 14a.

Figure 3:
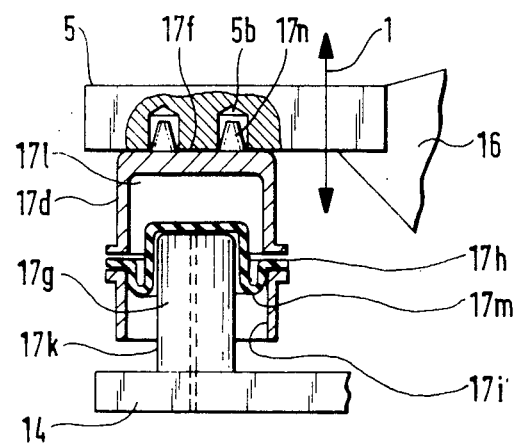
FIG. 3 is a fragmentary, cross-sectional side elevational view of a load cylinder arrangement for a pantograph load handling device employing a flexible diaphragm vertical movement device constructed and operating in accordance with the principles of the present invention.

In accordance with the invention a known piston-type load cylinder mechanism is replaced with a specially constructed flexible expansible chamber diaphragm device shown in FIG. 3 in which an inflatable and deflatable diaphragm 17h is loosely disposed between a cylinder part 17d (having upper and lower cylinder shell halves to sealably close the diaphragm) and a suppport post part 17g which serve as a support arrangement for the diaphragm.

With reference to FIG. 3, the diaphragm is functionally disposed in the separate piece support arrangement between the upper cylinder 17d, which is engaged with the undersurface 17f of the trackway 5 rigidly mounted on the guide carriage 16, and the support post 17g upstanding from and rigidly mounted at 17e to the left horizontal cross-arm portion of the vertical pillar 14a. Numeral 171 indicates the expansible pressure chamber area of the flexible diaphragm indicated by 17h.

The diaphragm's expansible chamber 171 is pressurized by flow of pressure agent admitted to, discharged from, or held in the chamber via suitable flow connection to a balancer valve system further described below. Depending on the pressure in the diaphragm chamber, the trackway 5 is vertically raised or lowered relative to the support post 17g (and hence the vertical pillar 14a). Pressure in the diaphragm chamber is converted into vertical movement due to the vertically directed volume confinement of the diaphragm provided by the cylinder 17d and the support post 17g. In order for the diaphragm to have sufficient space to collapse during deflation such as indicated by diaphragm fold 17m, the inner diameter 17i of the cylinder shell must be substantially greater than the external surface 17K of the diaphragm's support post 17g.

The cylinder 17d presses against the trackway 5 at 17f. It is centered and secured against twisting by means of a spaced apart series of conical pins 17n which engage in cooperating bores 5b formed in the undersurface 17f of the trackway 5.

Figure 4:
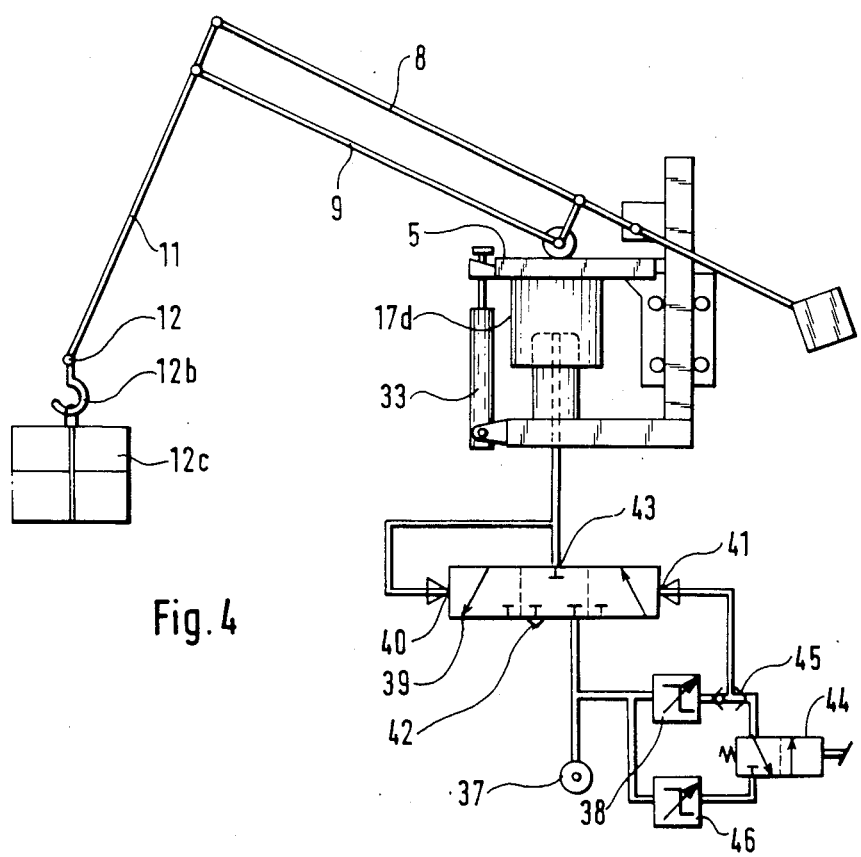
FIG. 4 is a side elevational schematic view showing a pantograph load handling device constructed and operating in accordance with the principles of the present invention and showing the operation of the pressure agent system and balancer valve arrangement.

As indicated by FIG. 4, the pressure agent has a source 37 connected to a balancer distributor valve 39 and to pressure valves 38 and 46 with which a reference pressure to be held constant for the particular load is set. The reference pressure is connected to the balancer valve 39 at a terminal 41 as a right control pressure to the distributor valve 39. The pressure in the diaphragm chamber acts on the balancer valve 39 at a terminal 40 as a control pressure acting in the opposite direction. The balancer valve is a three way path valve and is connected to the diaphragm chamber at 43 and to a discharge at 42. The reference pressure for the load handling device without a load 12c on the hook 12b is set with the pressure regulator 38. The reference pressure for the device with load is set with the pressure regulator 46. By means of connection via a two-way valve 44, the reference pressure proceeds from regulator 46 via an OR element 45 to the control terminal 41.

In accordance with pantograph principles, the pivotal centers of the roller 5a and the end 12 of the work arm 11 always move in the same direction. By means of admitting or eliminating pressure agent into or from the diaphragm chamber, the trackway 5 with roller 5a is moved up or down in the direction of arrow 1, guided by and centered with the guide carriage 16 so as to move only directly vertically and always maintaining a true horizontal disposition at every elevational position. Since the geodetic elevation for the roller 5a, as well as the pivot center or centers at the lower end of the work arm 11, 28, does not change despite movement of the roller 5a in the direction 2, no force is required to horizontally position the load other than that required to overcome the mass moment of inertia of the moving parts.

The weight of the work beams is compensated with the counter weight 13, so that the roller 5a remains on the trackway 5 in every position. With respect to a parallel beam structure, as shown in FIG. 2, the line between the pivotal centers 12a and 29 does not change its angle in space relative to the pillar 14a. Thus, the extension 30 connected to 12a and 29 permits horizontal loading or unloading into, for example, a shelf. A load hook can, of course, be secured to the extension 30. A control head, a rotary connection, or a grasping means can also be connected to the pivotal centers 12, 12a, 29 in place of a hook or extension part as illustrated here.

As a result of proper setting of the reference pressure with regulator 46, there is a pressure in the load cylinder mechanism which keeps the load 12c in its position. As a result of vertically lowering the load 12c, the pressure in the load cylinder mechanism is increased such that the balancer valve 39 moves toward the right as shown in FIG. 4. This causes the diaphragm chamber 171 to be connected via 43 to discharge 42, such that pressure agent flows out of the diaphragm which deflates. The pressure in the load cylinder mechanism is reduced as a result of lifting the load 12c such that the balancer valve 9 moves toward the left. This results in the diaphragm chamber 171 being connected is connected via 43 to the pressure agent source 37, such that pressure agent can flow into the diaphragm chamber which inflates.

When a load is lowered or lifted, there is no friction between the standard sliding seal of the piston and inside cylinder wall or in the heretofore required piston rod guide means to be overcome as a result of the invention diaphragm load cylinder mechanism. Hence, the invention affords an easier and even more sensitive and hence accurate load positioning capability for a pantograph load handling device, and movement fatiguing problems in accurately disposing the load are essentially avoided by virtue of the invention. In addition to elimination of friction, the expensive and bulky connections for a piston rod and associated cylinder are elminated and overall height is saved.

In order to permit deflection of the diaphragm at 17m, the inside diameter 17of the cylinder must be so much greater than the outside diameter 17k of the diaphragm support 17g that a precise guidance between the two parts is not provided and is not required. Vertical guidance for the trackway movement is assumed by the guide carriage 16.

By loosely connecting the diaphragm support cylinder to the trackway 5 at 17f, only pressure agent lift pressure forces can be transmitted. This prevents an underpressure from arising in the diaphragm expansion volume 171 should the guide carriage 16 be raised without being due to pressure agent being supplied to the diaphragm chamber (i.e. tensile forces) and thus prevents the diaphragm from forming folds which deteriorate its useful service life. In such instances, the diaphragm cylinder 17d (and the diaphragm 17h) will downwardly separate from the trackway 5. When the two meet again, the former relative position with respect to one another will be restored by means of the conical pins 17n which cooperate with the bores 5b.

Unexpected, sudden dropping of the load and of the work arms in the event of a tear in the diaphragm is prevented by means of the damper apparatus 33 which brakes such falling motion and prevents too high a downward acceleration and/or velocity. The interception or detent apparatus also brakes the raising motion of too high an upward acceleration and/or velocity. This prevents the trackway 5, the work arms and the guide carriage 16 from suddenly shooting up should an incorrect reference pressure act on the balancer valve 39, such as if, given connection of the reference pressure from the pressure control valve 46 by means of actuation of the valve 44, the load 12c is not attached or when the load should happen to suddenly break away.

Thus, it will be seen that we have provided an improved load handling device or manipulator which meets the objectives and advantages set forth above and which is simple and relatively inexpensive in construction and yet capable of accurately and carefully manipulatively handling a load.

We claim as our invention:

1. In a load handling mechanism having a horizontal work arm means pivotally carried on a vertical pillar disposed for rotation on a bearing means and a horizontal trackway supporting a roller connected to said work arm means and supported on a guide carriage means engaged with said vertical pillar for vertical movement, the improvement of a load cylinder means for controlling the vertical movement of said trackway, the improvement comprising:
   a flexible expansible diaphragm connected to a pressure agent supply, and
   a support means comprising a cylinder including upper and lower cylinder sections engaging respective upper and lower sides of and enclosing said diaphragm, said upper cylinder section connected to the trackway, and a support post engaging the lower side of said diaphragm.

2. The load handling mechanism of claim 1, wherein said lower cylinder section surrounds said support post and said support means loosely engages said trackway.

3. The load handling mechanism of claim 2, wherein said upper cylinder section engages said trackway by means of centering pins disposed in cooperating respective bores in the trackway.

4. The load handling mechanism of claim 3, wherein said centering pins are conical.

5. The load handling mechanism of claim 1, wherein said trackway is centered on said guide carriage means.

6. The load handling mechanism of claim 1, further comprising a damper means connected between said guide carriage means and said pillar for preventing sudden vertical movement of said trackway.

7. The load handling mechanism of claim 1, wherein said upper cylinder section has a closed end loosely connected to said trackway and said support post is mounted on said pillar upstanding toward the interior of said cylinder.

8. The load handling mechanism of claim 1, wherein said cylinder sections have an interior diameter substantially greater than the width of said support post such that said diaphragm can freely fold therebetween.

* * * * *